April 25, 1972      A. B. STILES      3,658,724
ADSORBENT OXIDATION CATALYST
Filed Dec. 6, 1967      2 Sheets-Sheet 1
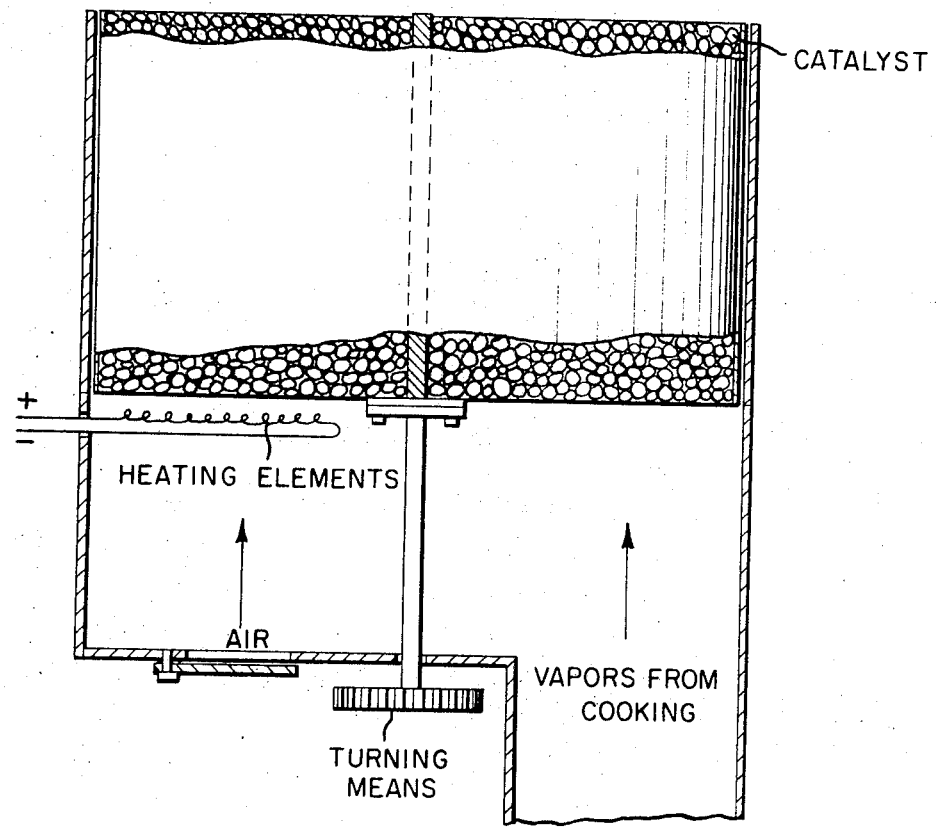
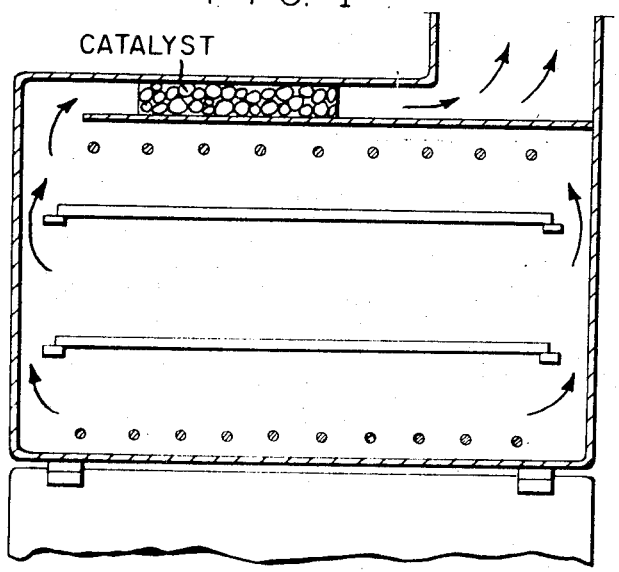
INVENTOR
ALVIN B. STILES
ATTORNEY

INVENTOR
ALVIN B. STILES

United States Patent Office 3,658,724
Patented Apr. 25, 1972

3,658,724
ADSORBENT OXIDATION CATALYST
Alvin B. Stiles, Wilmington, Del., assignor to E. I. du Pont de Nemours and Company, Wilmington, Del.
Continuation-in-part of application Ser. No. 657,700, Aug. 1, 1967, which is a continuation-in-part of application Ser. No. 379,160, June 30, 1964. This application Dec. 6, 1967, Ser. No. 688,407
Int. Cl. B01j 11/06
U.S. Cl. 252—446         4 Claims

ABSTRACT OF THE DISCLOSURE

Processes and compositions are described for the removal of undesirable components from vaporous effluents such as the removal of odorous and combustible components from the effluent gases of cooking processes. The compositions are catalytic adsorbent shapes which are made up of a porous material capable of adsorbing the undesirables, such as silica, alumina, other non-combustible refractories of high surface area or activated carbon, having one or more catalysts interspersed therein.

A process for making low temperature oxidation adsorbent catalysts is also described. In this process a gel-forming material and a decomposible catalytic salt are mixed and permitted to set to form a rigid structure. The salt is then decomposed to produce an enormous network of voids in the structure, thus producing strong adsorptive characteristics.

CROSS REFERENCE TO RELATED APPLICATIONS

This application is a continuation-in-part of my co-pending application Ser. No. 657,700, filed Aug. 1, 1967, now abandoned which application is a continuation-in-part of my copending application Ser. No. 379,160, filed June 30, 1964, now abandoned.

BRIEF DESCRIPTION OF THE DRAWINGS

FIG. 1 illustrates a conventional household range and broiler with a device for adsorbing odorous and combustible components from cooking gases.

FIG. 2 shows a modified apparatus for conducting a process of the invention wherein a rotating chamber presents first one half and then the other for first adsorption of objectionable components and then for regeneration.

BACKGROUND OF THE INVENTION

Figure 3:
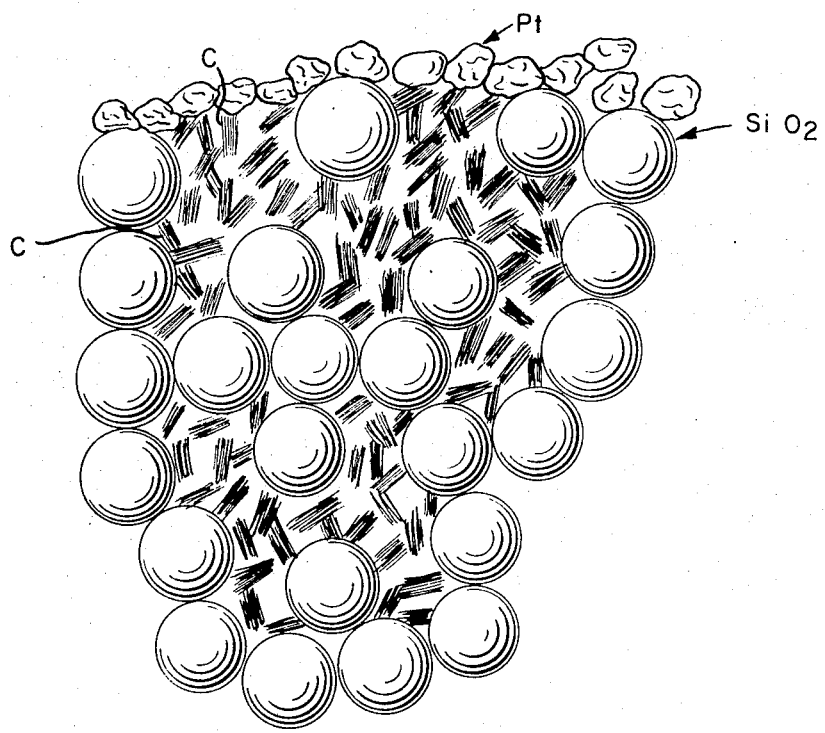
FIG. 3 is an artist's conception of the structure of a catalytic-adsorbent of the invention.

It has heretofore been proposed to adsorb on suitable adsorbent, such as activated carbon, those undesirable oxidizable vaporous materials which result from the operation of many industrial and domestic processes. Examples of some of these processes which result in these undesirables are printing operations, spray painting, petroleum processing, asphaltic impregnation, plastic molding, diesel or other internal combustion engine operations, other chemical processing, cooking in the home and so forth. The vapors trapped by this activated carbon gradually saturate the carbon and it is finally thrown out and replaced with fresh material. This is costly and, even more serious, the carbon becomes progressively less effective and it approaches exhaustion with a comparatively lengthy period of relatively poor operation.

Alternatively, a process can be utilized in which the effluent gases containing the undesirable vaporous components are heated to a high temperature, over 300° C., where oxidation can be effected employing catalyst compositions known in the art. This method is too costly due to the fuel required to heat large volumes of dilute gases to a sufficiently elevated temperature.

BRIEF SUMMARY OF THE INVENTION

This invention relates to the removal of undesirable vaporous components from various vapor streams, such as the removal of vaporous undesirables from cooking effluents, internal combustion engine exhausts, or from industrial processes in which volatile solvents are evolved either unaltered or only partially oxidized.

In such processes the odorous and combustible undesirables can be continuously adsorbed upon a composition of this invention and oxidized or cyclicly adsorbed and then oxidized by increasing the temperature. In either operation the undesirable components are first adsorbed upon an adsorbent solid of high surface area and then after a substantial amount have been adsorbed, they are driven from the solid by heating. As they leave the adsorbent solid they come into contact with an oxidation catalyst incorporated within and on the surface of the solid, whereby they are converted to carbon dioxide and water. This oxidation takes place at relatively low temperatures such as 300° C. or lower.

The invention is also directed to catalytic adsorbent shapes useful in the process which are comprised of an adsorbent which can be a non-combustible refractory of high surface area, e.g., silica, alumina or the like, or activated carbon mixed with such refractory, the adsorbent having an oxidation catalyst incorporated therein or on its outer surfaces. It is to be understood that when activated carbon is present as an adsorbent in the compositions, the carbon particles are dispersed throughout the composition so that they are separated by partciles of the high surface area refractory. This feature acts to prevent the carbon from oxidizing during use.

The invention is further directed to processes for making low temperature oxidation-adsorbent catalysts which are useful in the processes of the invention and also useful for other uses.

These processes involve mixing together to form a homogeneous mixture a gel forming material, e.g., dehydrated gypsum, silica, alumina, calcium aluminate and a decomposible catalytic salt. The mixture can optionally contain activated carbon and also an interdispersant. The mixture is then allowed to set to form a rigid structure. The decomposable salt is then decomposed by reduction or calcining to produce a large network of voids in the structure, thus producing strong adsorptive characteristics. This structure can then be converted to granular or powder form by milling or grinding. Then this material can be used as such, or if desired it can be applied to various materials, e.g., ceramic honeycomb, to form a supported catalyst.

The adsorbent catalyst thus produced can be used to adsorb and oxidize oils at low temperature. It can be used to selectively adsorb undesired components from vapors, solutions, dispersions and the like and then oxidize these components to carbon dioxide and water.

DETAILED DESCRIPTION OF THE INVENTION

In the process of the invention an adsorbent which carries a catalyst dispersed through it or upon its surface is charged into a suitable container. FIG. 2 illustrates a possible embodiment wherein the container is divided into two sections. The vapors from cooking pass from a cooking device through the right side of the container and are there adsorbed by the adsorbent material. This is continued until the effectiveness of the adsorbent becomes somewhat diminished and at that time the cartridge is rotated to bring the other half of the cartridge in the path of the vapors from cooking and to place the exhausted portion over a heating element. Heat is applied to the exhausted section of the cartridge and air is allowed to pass through. The heat drives the adsorbed components from cooking out of the adsorbent and as they emerge from the particles of adsorbent they come in contact with the catalytic material and are converted to carbon dioxide and water.

In FIG. 1 there is illustrated an alternative in which the adsorbent is contained in a cartridge at the top of an oven. The cartridge is located in the path of the fumes and vapors from cooking. After a period of normal operation the temperature of the broiler element is raised to heat the cartridge and air is allowed to flow through the cartridge and again to drive off adsorbed materials and to effect their catalytic conversion to carbon dioxide and water.

Instead of the cyclic operation as set forth above, the process can be operated in a continuous manner. In this process the adsorbent-catalyst is placed in a suitable container or holder in a gas stream containing the undesirable vaporous components. If the temperature of the adsorbent-catalyst or gas stream is high enough, the adsorbent-catalyst will adsorb and oxidize the undesirable components in a continuous manner. In view of the characteristics of the adsorbent-catalyst, the oxidation can occur at relatively low temperatures, i.e., as low as 75° C. In fact in many processes the process will operate continuously at the temperature of the gas stream and no additional heating will be required.

A catalytic-adsorbent useful in the process of the invention contains a highly adsorbent material of types already well-known in the art such as high surface area refractory oxides, or activated carbon mixed with a refractory oxide. There can be used for example activated carbon, silica, alumina, silica-alumina, alkaline earth oxides, pumice, bauxite, mixed rare earth oxides, magnesia, zirconum silicate, molecular sieves, cerium oxide and others. Preferred adsorbents are silica, alumina, silica-alumina, or activated carbon mixed with these oxides. The silica can be in the form of any of the usual silica gels, which can, if desired, include other materials such as alumina. The alumina can be any very adsorbent form of alumina and can be selected from any of the so-called activated aluminas including one or a plurality of the forms gamma, eta, chi, and kappa.

The activated carbon can be any of the adsorbent carbons well-known in the art. If carbon is a component of the adsorbent it should be coated with a finely divided nonflammable material such as silica or alumina. The coating of silica or alumina or a similar material will act to prevent the carbon from burning gduring the regeneration as practiced in processes of the invention.

The silica or alumina or similar material used for coating the activated carbon are initially in the form of an aquasol; the preferred sols are those commercially available sols in which the silica or the alumina is present as particles having a diameter from about 4 to 25 millimicrons. The particles of silica and alumina in sols can range up to the limits of colloidal size, say about 150 millimicrons. The silica particles are roughly spherical.

The aquasol is mixed with the activated carbon and a gel structure containing the carbon is developed. The structure is then dried to remove water and subsequently impregnated with catalytic material.

In FIG. 3 of the drawing there is illustrated activated carbon coated with silica particles as described in more detail in Example 1.

The adsorbent material should have a high surface area and ordinarily the surface area should be in excess of about 100 square meters per gram. The surface area can be quite high running up to 600 or 800 square meters per gram or even higher.

The proportion of the silica or alumina to activated carbon can be widely varied though generally it will be desirable to have enough silica substantially to effect coating of the carbon. Generally from aout 0.1 to 20 parts by weight of silica or alumina should be used for each part by weight of carbon.

The catalyst-adsorbents used according to the invention are made catalytic by impregnation with a catalytic material in the conventional manner. Thus the salt of a catalytic material can be precipitated or coated onto the adsorbent support material and subsequently decomposed by calcining or reduction to produce a more active form of catalytic material while at the same time increasing the surface area available for adsorption by increasing the pore distribution in the catalyst-adsorbent structure.

The catalytic material used can be any oxidation catalyst. Preferred catalysts include ruthenium, palladium, platinum, or the oxides, cerates, manganates, manganites, chromates, chromites, or vanadates of cobalt, nickel, cerium, iron, manganese, chromium, copper, zinc, bismuth, silver, rare earths, molybdenum, tungsten, tin, arsenic and antimony; and mangano-chromia-manganites and, of course, mixtures of these.

Especially preferred are mangano-chromia-manganites, ruthenium, rhodium, platinum, palladium, the oxides, chromates, chromites or vanadates of cobalt, copper, iron, cerium, nickel and manganese, or mixtures thereof, because of their comparatively high activity at low temperatures.

The mangano-chromia-manganite catalysts are described and claimed as such and with co-catalysts, intersperants and suports in the following patents and applications and reference can be had to such for further details. A general description should be sufficient here.

U.S. Pat. No. 3,228,746
U.S. Pat. No. 3,220,794
U.S. Pat. No. 3,216,954

The mangano-chromia-manganites have the following empirical chemical composition:

$$XCR_2O_n \cdot 2YMnO_m$$

in which $n$ can be 2, 3 and 6 and $m$ can be 1, 1.33, 1.5, 2, and 2.5. The Mn:Cr weight ratio can vary from 3:0.5 to 3:30. The atomic ratio, that of Y:X, is substantially the same and thus when Y equals 3, X can equal 0.5 to 30.

A mangano-chromia-manganite can be prepared having a ratio of Mn:Cr of 3:2 according to methods of Lazier U.S. Pats. 1,746,782 and 1,964,001 and Wortz U.S. Pat. 2,108,156. In these and other prior suggestions of manganese chromites, it is proposed that equimolecular amounts of the manganese compound and the chromium compound be used which in aqueous solutions results in a product having a ratio of 3:2 because a third of the chromium is not precipitated and is washed away.

The mangano-chromia-manganite can be prepared by procedures which are described in detail in U.S. Pats. 3,228,746; 3,220,794; and 3,216,954 above mentioned. Generally, it can be said that they are prepared by reacting appropriate salts of manganese and chromium in aqueous solution. Thus manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source only by adding after filtration further chromium compound, such as ammonium chromate, to the precipitate thus prepared. Alternatively the appropriate proportion of suitable salts such as manganese nitrate with chromium nitrate can be precipitated or fused together to give mangano-chromia-manganites of the desired Mn:Cr ratio.

A co-catalyst can be included with the mangano-chromia-manganite and there can be used, for example, such co-catalysts as those described in U.S. Pat. 1,964,001. Thus one of the following can be added as the carbonate or can be added as a basic chromate or oxide:

Copper, nickel, zinc iron, cadmium, cobalt, tin bismuth.

Thus, co-catalysts can, of course, be added as other compounds depending upon the specific treatment and processing conditions used.

The weight ratio of co-catalyst:mangano-chromia-manganite can vary greatly and can range from, say, 10:1 to 1:10. About 1:1 is preferred.

The catalysts such as the precious metals and the oxides, cerates, etc., of the precious metals and the others listed are ordinarily most readily formed in situ by the treatment of the adsorbent with appropriate salts which upon heating or reduction form the desired catalyst. This will be illustrated in the examples.

Alternatively the catalyst can be preformed as an uncalcined filter cake or dry powder which can be incorporated into the adsorbent by a mixing or grinding operation. The catalyst can also be formed upon an appropriate particulate carrier and can then be heat treated after incorporation into the catalyst-adsorbent slurry or paste. If carbon is a component of the catalyst-adsorbent, the heat treatment should not be conducted at temperatures above about 500° C. for above this temperature there is significant oxidation and deterioration of the carbon.

The adsorbent-catalyst can also be formed into structures such as saddles, ceramic honeycombs, pills, extrudates, rings, or cylinders, or applied to such structures to form a supported catalyst.

The amount of catalyst incorporated into or onto the adsorbent carriers can be widely varied and only enough should be used to effect the desired catalytic conversion. Ordinarily from about 0.01 to 25% by weight based on the weight of the adsorbent carrier will be used while more specifically it is preferred to use from about 0.1 to 10% by weight.

A preferred catalyst for use in the process of the invention is made by incorporating a decomposable salt or other intermediate of the catalyst in aqueous admixture with a gel-forming material, e.g., a silica sol dehydrated gypsum or powder of high surface area alumina. This mixture can optionally contain activated carbon. The mixture is dried to produce a fixed structure encompassing the catalyst, cement or gel forming material and activated carbon, if any, as a well dispersed finely divided composite. Upon formation of the fixed structure of the gelable material, the structure is calcined or reduced at a sufficient temperature to decompose the catalyst intermediate, but not a high enough temperature to cause oxidation of the carbon or collapse of the adsorptive structure. The calcining takes place in an oxidizing, reducing or neutral atmosphere to decompose or reduce the salt. This decomposition of the entrapped decomposable salt or catalyst intermediate increases the quantity of pores, particularly those of under 200 Angstroms, with the result that adsorption characteristics of the structure are markedly improved. The density of the final structure will generally be only 75 to 85% of its uncalcined density.

Subsequent to this treatment, catalytic materials such as precious metal salts can be impregnated into and on the adsorbent structure with enhancement of catalytic effect and without destruction of the pores or adsorptive capacity. Also, if desired, an interspersant, e.g., a refractory material, can be incorporated into the structure prior to calcining.

This process is illustrated in Examples 12 through 20. A particularly preferred catalyst is exemplified in Example 12 and it is made by preparing a homogeneous aqueous mixture of 12 to 20% silica, 7 to 13% alumina, 4 to 16% activated carbon, 10 to 14% manganese oxide, 0 to 6% nickel oxide, 0 to 6% cobalt oxide and 13 to 23% chromium oxide, at least partially combined as chromites, forming the mixture in a gel by drying, calcining to 350° C. and impregnating the resulting porous structure with platinum and palladium.

In the above process the gel-forming material can be any material that forms any of the high surface area gels, e.g., silicon as colloidal silica, dehydrated gypsum, the hydroxides of aluminum, zinc, barium, calcium, chromium, magnesium, lanthanum, molybdenum, tungsten, cerium, strontium, iron, titanium, zirconium, hafnium, the rare earths and mixtures thereof. These gels can be derived by processes well known in the art such as the precipitation of silica from a sol, aluminum hydroxide from aluminum nitrate solution using ammonium hydroxide or by hydrating calcium sulfate, calcium aluminate or magnesium oxychloride.

The decomposable salt will be any of the chromites, hydroxides, chlorides, oxides, nitrates, amines, basic chromates, manganates, oxalates, acetates, carbonates, formates, benzoates, succinates, chelates, or acetyl acetonates of ruthenium, palladium, platinum, rhodium, cobalt, nickel, cerium, iron, magnesium, chromium, copper, zinc, cadmium, bismuth, silver, molybdenum, vanadium, tungsten, tin, and the rare earths or mixtures thereof. These salts will subsequently be decomposed or reduced to provide the catalytically active oxides or elemental form of the metals.

The proportions of gel-forming material and decomposable salt can vary widely, thus the aqueous composition can contain on the dry basis from 1 to 99% by weight cement or gel-forming material and 0.01 to 99% decomposable salt.

The composition can, if desired, contain activated carbon, thus it can contain 0 to 80% carbon solids, the quantity being limited by its resistance to oxidation during use. Further it can contain interspersants. Useful interspersants and methods for incorporating them into the composition can be found in U.S. Pat. 3,317,439.

The aqueous composition is mixed until it becomes homogeneous and the catalytic material is uniformly dispersed throughout the mixture. This mixture can be sprayed, painted or otherwise coated onto suitable supports herein already enumerated. It can also be extruded as pellets of various shapes. The mixture, whether coated or uncoated, is then allowed to set up to form a rigid film or structure. The resultant material can be any desired shape.

The structure is then calcined in an oxidizing, reducing or neutral atmosphere to decompose the salt. This decomposition creates a large network of voids throughout the structure while the structure retains its overall dimensional integrity. The final structure will have an increase in porosity of at least 1%, and generally 15 to 50% over that of an uncalcined structure. The structure is then ready for use, or, if desired, it can be milled or ground and screened to form granules or a powder. These particles can also be bonded to a separate support such as a ceramic honeycomb by conventional techniques.

For many end uses, it will be desirable for the catalyst-adsorbent to contain additional catalytic materials. This can be accomplished using the prior art techniques previously set forth. Thus the calcined, porous structure can be immersed in a solution of a salt of a catalytic metal, the salt caused to precipitate onto the structure, and the metal activated by subsequent reduction or calcining.

The catalyst thus produced can be used to remove undesirable components from various streams since it will adsorb the material and hold it in position long enough for catalytic oxidation to occur even at surprisingly low temperatures. This catalyst has the advantage in that it will adsorb at relatively high temperatures and oxidize at relatively low temperatures.

The catalyst has application in treating exhaust fumes from engines, machines and industrial operations generally, use in removing cooking odors, use in air conditioning as an air purifier, use in ventilation devices to oxidize solvents such as those from paints and varnishes; it can also be used in incinerators.

In order that the invention may be better understood reference should be had to the following illustrative examples. Parts are by weight unless otherwise indicated.

Example 1

(1) 100 parts of activated carbon, pulverized to pass 100% through a 200-mesh screen, having a surface area of 800 m.$^2$/gm. and a soluble ash content of .01 or less, is mixed with an equal part by weight, on an $SiO_2$ basis, of a 15% $SiO_2$ aqueous silica sol. The $SiO_2$ spheroids in the sol have a diameter of 7 millimicrons and the sol has less than 0.1% sodium. The carbon and sol are mixed to form a wet paste having the consistency of putty. It is noted that the silica sol is prepared as in U.S. Pat. 2,750,345.

(2) This paste is extruded to produce cylinders 1/8" in diameter x 1/8" long. The relationship of the silica spherulites and the carbon is shown in FIG. 3 with the silica spheres being represented as circles and the carbon as rough grains surrounding the spheres.

(3) The extruded cylinders are dried to remove excess water.

(4) The dried cylinders are impregnated with sufficient platinum chloride to be equal to 0.1% platinum on the granules based on the total weight of granules. The platinum chloride is reduced to elemental platinum by exposure to a stream of humidified hydrogen at temperatures increasing from 75° to 200° C. over a period of two hours.

The catalyst thus prepared is an effective adsorbent for vapors and particularly organic vapors which, when the adsorbent is heated, will be evolved and oxidized by the catalytic material on the surface. Typical organics which can be adsorbed and oxidized are aldehydes, both saturated and unsaturated, oils such as cooking fats, and odorous materials such as organic amines and esters. Organic acids such as butyric are also adsorbed and oxidized under conditions favoring adsorption at low temperature and conditions favoring desorption and oxidation, which would be higher temperatures. The catalyst-adsorbent of this example can be used in apparatus such as that shown in FIGS. 1 and 2.

Example 2

(1) 100 parts of activated carbon having a total ash content of less than 1%, a surface area of 850 m.$^2$/gm. and passing 100% through a 200-mesh screen, is mixed with 100 parts of $SiO_2$ as a 30% $SiO_2$ silica sol having silica spherulites 15 millimicrons in diameter, and 100 parts of fibrous aluminum oxide monohydrate having a crystal structure of boehmite to produce a putty-like paste. The silica sol is of the type described in U.S. Pat. 2,577,485. The fibrous alumina monohydrate is prepared as in Example 11 of U.S. Ser. No. 374,295, filed June 11, 1964 now U.S. Pat. No. 3,207,578. The fiber length, surface area and other characteristics are as shown therein.

(2) The mixture is compressed and extruded as 1/16" x 1/16" cylinders.

(3) The cylinders are dried and then activated by heating in steam at 700° C.

(4) They are next impregnated with cerium oxide by precipitating cerium carbonate from cerium nitrate using ammonium carbonate solution as the precipitant onto the granules to produce a cerium oxide content of 3% of the total weight of the cylinders.

(5) The cylinders with the cerium carbonate are calcined at 350° C. in an atmosphere controlled to prevent over-oxidation of the carbon in the cylinders.

(6) Cylinders are next impregnated with a mixture of platinum-rhodium chlorides in equal weight quantities of platinum and rhodium to produce a total weight of .01% metals on the cylinders.

(7) The platinum and rhodium chlorides are reduced to the respective metals by exposing the cylinders to an atmosphere of hydrogen at temperatures increasing from an initial 75° C. to a final 200° C.

This catalyst is also useful for the adsorption and combustion of objectionable vapors and fumes arising from cooking, food processing, and industrial processing such as those encountered in paint and varnish industry and other operations involving the uses of solvents or organic cleaners, or in which a smoke or objectionable fume is derived. The catalyst-adsorbent of this example can be used in apparatus such as that shown in FIGS. 1 and 2.

Example 3

(1) 100 parts of carbon, 300 parts of $SiO_2$ as a 35% colloidal silica aquasol having a spherulite size of 100 millimicrons and 200 parts of a finely divided aluminum trihydrate, all of the materials passing 100% through a 200-mesh screen, are charged to a ball mill for further reduction in size. They are milled until all components could be readily sieved by washing through a 325-mesh screen. It is noted that the colloidal silica is of the type prepared according to Bechtold and Snyder U.S. Pat. 2,574,902.

(2) The paste produced from the above ingredients is compressed into a grid resembling a honeycomb structure having cells approximately 1/4" across the flats of the hexagonal cells.

(3) The entire honeycomb structure is impregnated with a weight of platinum and ruthenium chloride which, on reduction as described in Examples 1 and 2, produces a total weight of platinum and ruthenium of 1%. The platinum and ruthenium are present in equal weight percentages.

The grid thus produced is effective for fume abatement in the flue of industrial appliances where the cyclic conditions result in the temperature of the flue being alternately cold and warm. Adsorption of the fumes occurs during the cold cycle, but during the warmer portion of the cycle the fumes are both evolved from the carbon and oxidized and those emanating from the operation are simultaneously oxidized over the catalyst-adsorbent grid. The catalyst-adsorbent of this example can be used in apparatus such as shown in FIGS. 1 and 2.

Example 4

(1) 500 parts of activated carbon having a surface area of 750 m.$^2$/gm. and an acid soluble ash content of less than 0.1% is milled together with 100 parts of aluminum trihydrate and 100 parts of $SiO_2$ as a silica sol as in Example 3 until all of the constituents can be passed through a 325-mesh screen.

(2) The resultant milled paste is compressed into cylindrical rings having an outside diameter and length of 3/8" and a hole in the center 1/4" in diameter.

(3) The dried cylinders are impregnated with 3% cerium oxide and 0.05% platinum as previously described to produce an effective catalyst for the aforementioned operations.

The catalyst-adsorbent of this example can be used in apparatus such as that shown in FIGS. 1 and 2.

Example 5

(1) 100 parts of powdered, activated carbon and 300 parts of fibrous aluminum monohydrate of the type mentioned in Example 2 and 100 parts of gamma-alumina on which has been precipitated 50 parts of mangano-chromia-manganite prepared by the process described in Example 1 of U.S. Pat. Howk et al. 3,228,746, issued Jan. 11, 1966 are milled together with water to produce a finely divided solid in the form of a paste. The mangano-chromia-manganite has an Mn:Cr ratio of 3:12.

(2) The paste is formed into 3/16" x 3/16" cylinders and dried to remove excess water. This catalyst adsorbent is useful for operations previously described.

(3) The adsorbent of Instruction 2 can be further coated. First it is coated with 3% cerium oxide by slurrying the cylinders in a solution of cerium nitrate and precipitating the cerium as cerium carbonate in such a way as to achieve an eventual 3% cerium oxide retained on and within the granules. The granules are heated to 300° C. to decompose the cerium carbonate. The cylinders are then immersed in a solution containing 30 grams of elemental nickel as nickel carbonate dissolved in ammoniacal ammonium nitrate solution, and diluted with sufficient water to produce one liter of total solution.

(4) The cylinders are next calcined at 400° C. to decompose the nickel-amine-carbonate complex and effect the placement of 2% nickel oxide on the surface. The concentration of nickel-amine-carbonate solution previously described is adequate to give the 2% nickel oxide nominally on the cylinder.

(5) One-half percent of total metals as an equal weight of platinum and rhodium as chlorides is next placed on the cylinders and reduced as previously described. This catalyst is similarly effective for fume adsorption and oxidation. The catalyst-adsorbent of this example can be used in apparatus such as that shown in FIGS. 1 and 2.

Example 6

These instructions are the same as for Example 5 with the exception that the nickel and the cerium are mixed and then heated to 650° C. and thus combined chemically produce nickel cerate. A further difference is that equal weight percent of ruthenium is substituted for the rhodium specified for Example 5. The catalyst-adsorbent of this example can be used in apparatus such as that shown in FIGS. 1 and 2.

Example 7

The instructions are the same as for Example 6 except that an equal weight of nickel manganate derived by calcining nickel and manganese oxide is substituted for the nickel cerate and 3% cerium oxide is substituted for 0.5% total platinum and ruthenium. This catalyst-adsorbent can be used in apparatus such as that shown in FIGS. 1 and 2.

Example 8

This example is the same as Example 7 except that an equal weight quantity of nickel chromite is substituted for the nickel manganate. The nickel chromite is derived by a separate precipitation of the nickel as basic nickel chromate which, on calcining at 350° C., becomes nickel chromite. (Procedure described in U.S. Pat. 1,964,001.) The catalyst-adsorbent of this example can be used in apparatus such as that shown in FIGS. 1 and 2.

Example 9

(1) A weight equal to the weight of cylindrical rings used in Example 4 of eta-alumina granules as 4 to 8 mesh size and having a surface area of 400 m.²/gm. are impregnated with cerium carbonate via the instructions pertaining to Example 4, and are subsequently calcined to produce cerium oxide on the alumina granules.

(2) The granules are next impregnated with a quantity of platinum equal to 0.1% of the weight of the impregnated granules which is later reduced from the chloride to elemental metal. The catalyst-adsorbent of this example can be used in apparatus such as that shown in FIGS. 1 and 2.

Example 10

The instructions are the same as for Example 9 except that an equal weight of silica-alumina in the form of 3/16" right cylinders and having a composition of 88% silica and 12% alumina is used instead of the eta-alumina. The catalyst-adsorbent of this example can be used in apparatus such as that shown in FIGS. 1 and 2.

Example 11

The same instructions are followed as for Example 10 except the support and adsorbent in this case is an equal weight of silica-magnesia in the form of 3/16" right cylinders, and the silica content is 75%, and the magnesia is 25%. The catalyst-adsorbent of this example can be used in apparatus such as that shown in FIGS. 1 and 2.

EXAMPLE 12

A catalyst adsorbent composition of this invention is prepared as follows:

(1) A solution is prepared by dissolving the following materials; 716 parts of a 50% manganese nitrate solution, 145 parts nickel nitrate hexahydrate, 145 parts cobalt nitrate hexahydrate and 300 parts chromium trioxide ($CrO_3$) in sufficient distilled water, at a temperature of 30° C. to produce 3000 parts of solution.

(2) There is separately prepared 500 parts of ammonium carbonate dissolved in five thousand parts of distilled water.

(3) With the solution produced in item 1 being rapidly agitated the ammonium carbonate solution produced in item 2 also at 30° C. is added to the solution of item 1 until the pH has reached 6.4 plus or minus 0.2.

(4) The slurry is digested for one hour at 30° C. plus or minus 3° C.

(5) The slurry is filtered and washed with 4000 parts of distilled water. The filter cake thus derived is that called for the preparation of the catalyst adsorbent in ensuing instructions.

(6) 600 parts of the filter cake derived in item 5 is charged to a 4 liter ball mill containing 2½ liters of grinding balls having ¾" x ¾" cylindrical shape.

(7) Charged also to the ball mill are 100 parts of JU-activated carbon sold by the Barnabey-Chaney Company of Columbus, Ohio. Charged also to the ball mill is 100 parts of C-333 alumina hydrate which has been calcined previously at 400° C. for three hours. The C-333 alumina is that sold under this designation by the Aluminum Company of America. Next, the ball mill is charged with 2400 parts of "Ludox SM." "Ludox SM" is a trade name designation of the assignee for colloidal silica.

(8) The ball mill is rotated for 16 hours and then the milled slurry is removed and dried at 150° C. for 16 hours.

(9) It is then calcined at 350° C. for 30 minutes.

(10) The catalyst is then crushed and screened to the proper mesh size, which is 6 to 10 mesh.

(11) 1000 parts of the granules produced in item 10 is moistened with 1000 parts of a palladium nitrate solution containing 1.5 parts elemental palladium.

(12) The moist granules are dried and calcined for 30 minutes at 250° C.

(13) The granules are then moistened a second time with 1,000 parts of a solution of cholor platinic acid containing .5 parts of elemental platinum.

(14) The granules are then dried and calcined at 250° C. for 30 minutes.

The catalyst thus produced is useful for oxidations in general at low temperature. Specifically, it can be charged to a container 2" x 4" x 8" in which the walls are composed of 10 mesh screen thus making it possible for gas to flow from one side to the other side of the container. When this container is inserted in a gas stream such as that evolving from a domestic cookstove, it will adsorb the odors and greases volatilized during the cooking operation. On subsequent heatings at 200° C. for 30 minutes with only air of convection, the catalyst will be regenerated and desorbed; the combustible materials will be oxidized and removed.

The canister as above fabricated and derived is inserted in a suitable housing just above the oven of a domestic cook stove. The gases evolving from the oven pass through the canister and during the course of the baking of a roast of beef there are evolved cooking odors, volatile fats and oils which are adsorbed by the catalyst adsorbent canister. As the cooking continues, the oven heats to its normal operating temperature, driving heated air and oil containing gases through the canister, thereby heating the catalyst adsorbent to the temperature pertaining in the oven.

Under these temperature conditions the oils and combustibles already adsorbed on the catalyst-adsorbent are oxidized and removed as non-odorous, non-offensive water and carbon-dioxide. Also, the oils, fats and other combustible materials in the gases evolving at this time are immediately and continuously oxidized to the harmless components mentioned above.

The catalyst canister as derived above can also be inserted in a gas stream from a paint-spraying chamber. The gases evolve from the chamber at 205° C. and are passed immediately over the catalyst in the canister. At this temperature the paint fumes and solvents are continuously and completely oxidized as they pass through the catalyst. It has also been found that clean-up is effective and complete at temperatures as low as 127° C.

Example 13

Example 12 is repeated except that a stoichiometrically equivalent amount of copper nitrate is substituted for both the nickel and cobalt nitrates specified in item 1 of Example 12 resulting in a catalyst of similar effectiveness.

Instead of copper nitrate as specified above a stoichiometrically equivalent amount of iron nitrate, zinc nitrate, cerium nitrate or other rare earth nitrates can be used to make a catalyst adsorbent of similar effectiveness.

In place of the nitrates of the above described metals, other decomposable salts such as the sulfates, acetates, chlorides or formates can be used according to the procedure of Example 12 to produce satisfactory adsorbent-catalyst compositions.

Further, instead of the colloidal silica solution specified in item 7 of Example 12, there can be used 350 parts calcium aluminate, magnesium oxychloride or calcium sulfate and 2000 parts of water.

Eample 14

An adsorbent-catalyst is prepared according to the procedure of Example 12 with the exception that in item 7 no activated carbon is added to the ball mill but instead the quantity of alumina hydrate is increased by 100 parts to a total of 200 parts. This catalyst is effective for adsorption catalytic use and can be applied at higher temperatures than is possible with the catalyst of Example 12.

If the adsorbent catalyst must be used in a system having widely fluctuating temperature ranges and temperatures exceeding 400° C., it is preferable to use this material.

Example 15

The procedure to be followed in this example is similar to that specified in Example 12 with the exception that no chromium-trioxide is used but all other operations of the procedure remain the same. The catalyst thus derived can be used in the granular form or supported on honeycomb structures and is especially effective for water treatment.

When used for water treatment in the granular form, the catalyst can be very finely subdivided into 50 to 100 mesh particles. The smaller particles are more effective for removing small quantities of impurities at a relatively rapid rate. Regeneration is effected by raising the temperature of the spent material in an oxidizing atmosphere to 200 to 300° C.

Example 16

A stoichiometrically equivalent amount of the oxalates of manganese, nickel, cobalt and chromium salts used in Example 12 are used in place of the product of item 6 of Example 12. These are added to a ball mill and prepared as described in items 7 through 14 of Example 12 resulting in an adsorbent catalyst of similar utility.

Example 17

(1) Sixteen hundred parts of distilled water is added to a suitably sized ceramic tank; 69 parts of ammonium molybdates assaying 81% molybdic oxide, and 4.5 parts of ammonium metavanadate are dissolved in the distilled water by agitation. The solution is adjusted and maintained at 30 to 35° C.

(2) Sixty-eight parts of a 35% hydrochloric acid solution is next added rapidly to the tank.

(3) There is immediately added to the tank a solution comprising 60 parts of ferric chloride nonahydrate which has been dissolved in 450 parts of distilled water.

(4) The addition of the ferric chloride causes a yellow precipitate to form which is agitated in the slurry for 60 minutes, then is filtered to produce a moist filter cake.

(5) Seven hundred parts of the filter cake derived in 4, together with 2000 parts of a 15% solution of colloidal silica having a spherulite size of 70 Angstroms, and 100 parts of finely powdered diatomaceous earth are all added to a suitably-sized ballmill.

(6) The ballmill is rotated for 18 hours, then the product is discharged.

(7) The discharged slurry is dried at 150° C., then calcined for 2 hours at 500° C. in air.

(8) The dried cake is next crushed and screened to 4 to 8 mesh. The catalyst so derived is effective for the oxidation of methanol to formaldehyde, and the reaction of ammonia, oxygen and propylene to produce acrylonitrile.

Instead of drying the milled paste, it can be extruded and formed into rods, pellets, or other suitable extruded shapes for a fixed bed or fluidized reactor.

Example 18

(1) Four hundred twenty parts of copper sulfate hexahydrate and 840 parts by weight of zinc sulfate hexahydrate are dissolved in an agitated vessel containing 5000 parts of distilled water.

(2) The solution is adjusted and maintained at a temperature between 25 and 30° C.

(3) Six hundred twenty parts by weight of sodium carbonate are dissolved in 5000 parts of distilled water in a separate vessel.

(4) The sodium carbonate produced in item 3, above, is added over a 35 minute period to the zinc-copper sulfates solution obtained in item 2, above.

(5) The copper carbonate-zinc carbonate precipitate is washed sufficiently to remove all sulfur compounds to a level of less than $\frac{1}{100}$ percent sulfur content. After washing, the slurry is filtered and the filter cake is saved.

(6) One thousand parts of the filter cake thus derived is placed in a ball mill, together with 2500 parts by weight of a colloidal silica solution containing 15% $SiO_2$ and having spherulites which are 150 Angstroms in diameter. There is also added 100 parts by weight of finely divided diatomaceous earth.

(7) The ball mill is rotated for 6 hours, then the slurry is removed, dried, and calcined at 400° C.

(8) The calcined slurry is mixed with 1% graphite, then is pilled in a pilling machine of the type used in the pharmaceutical industry.

Instead of adding the colloidal silica and the diatomaceous earth to the ball mill as specified above, the diatomaceous earth can be added to the zinc-copper sulfates solution and the colloidal silica can be added to the sodium carbonate solution. After precipitation, washing, and filtration, the filter cake can be immediately dried, calcined, and mixed with graphite and pilled as described above.

Also, instead of adding the colloidal silica in the sodium carbonate solution, it, together with the diatomaceous earth, can be added to the copper-zinc sulfates solution, then processed as described in the paragraph just preceding. The catalysts thus derived are suitable for the conversion of carbon monoxide plus steam to carbon dioxide and hydrogen.

Example 19

(1) An iron oxide-chromium oxide catalyst is prepared by a typical method such as the dissolving of 1000 parts of iron sulfate (copperas) in 5000 parts of distilled water and adding thereto a solution having a ratio of 20 mole percent sodium chromate and 80 mole percent sodium hydroxide solution as a combined 10% solution to the iron sulfate solution until the pH of 7.1 is reached.

(2) The precipitate thus produced is washed to remove sulfate ion to a level of approximately .4% equivalent sulfur in the dried iron chromate-chromite finished catalyst. After washing, the catalyst is reslurried to its original volume and there is added to the same precipitation tank 100 parts by weight of pulverized diatomaceous earth, together with 900 parts by weight of a colloidal silica solution containing 5% silica as 200 Angstrom spherulites. Ammonium carbonate is added to the slurry to effect complete gelling of the silica sol.

(3) The resultant slurry is filtered, dried, calcined at 450° C., then is mixed with 2% graphite and is pilled to form ³⁄₁₆" solid cylinders. The catalyst thus produced is effective for the conversion of steam plus carbon monoxide to carbon dioxide and hydrogen.

Example 20

(1) Two thousand parts of solution is prepared comprising 1800 parts of distilled water and 200 parts of ammonium molybdate. While this solution is rapidly agitated, 50 parts of finely divided eta elumina is added. The alumina is derived by calcining at 400° C. the product resulting from the hydrolysis of aluminum alkyls such as aluminum tridecane and is an article of commerce.

(2) There is separately prepared an aqueous solution comprising 1000 parts of distilled water and 300 parts of cobalt nitrate hexahydrate.

(3) While the solution prepared in 1 is rapidly agitated and is at a temperature of 15° C., the solution prepared in item 2 is added over a period of 30 minutes.

(4) The slurry is adjusted to a pH of 7.0, and at this pH and a temperature of 50° C., 1700 parts of a solution of colloidal silica containing 15% silica having spherulite size of 70 Angstroms is added over a period of 30 minutes.

(5) The slurry should gel and if it does not, sufficient dry ammonium bicarbonate is added to effect gelling.

(6) The slurry is filtered and the filter cake is dried, then is calcined at 500° C., and finally is granulated to produce granules of 4 to 8 mesh size. The catalyst thus produced is effective for desulfurization reactions, as well as for the selective oxidations such as butane to maleic and fumaric anhydrides.

Instead of completely drying the filter cake as called for above, it can be partially dried to form a relatively thick paste which can be extruded as cylinders, tubes or other shapes which are dried, and calcined as above. These extruded shapes also are useful for the operations enumerated above.

I claim:

1. A porous catalytic- absorbent shape being made by mixing activated carbon particles with a gel forming material selected from the group consisting of silica and alumina to form a gel structure of activated carbon particles separated by particles of silica or alumina and having a surface area in excess of 100 m.$^2$/g., the gel structure then being impregnated with an oxidation catalyst and calcined.

2. The porous catalytic-absorbent shape of claim 1 in which the oxidation catalyst is selected from the group consisting of ruthenium, paladium, platinum, rhodium; the oxides, chromates, chromites or vanadates of cobalt, nickel, cerium, iron, maganese, chromium, copper, zinc, bismuth, lead, silver, rare earths, molybdenum, tungsten, arsenic, antimony; mangano-chromina-manganites; and mixtures thereof.

3. The catalytic adsorbent of claim 1 in which the particles of silica and alumina have a diameter from 4 to 25 millimicrons.

4. A catalytic adsohbent shape being made by preparing a homogeneous aqueous mixture of 12 to 20% silica, 7 to 13% alumina, 4 to 16% activated carbon, 10 to 14% manganese oxide, 0 to 6% nickel oxide, 0 to 6% cobalt oxide and 13 to 23% chromium oxide, forming said mixture into a rigid structure by drying, calcining the rigid structure to 350° C., and impregnating the resulting porous structure with platinum and palladium.

References Cited
UNITED STATES PATENTS

| | | | |
|---|---|---|---|
| 1,972,368 | 9/1934 | Alex | 252—446 |
| 2,523,875 | 9/1950 | Morrel et al. | 252—447 |
| 2,727,023 | 12/1955 | Evering et al. | 260—94.9 |
| 3,254,966 | 6/1966 | Bloch et al. | 23—2 |
| 3,333,017 | 7/1967 | Schuck et al. | 252—447 X |
| 3,338,666 | 8/1967 | Sanchez et al. | 23—2 |
| 3,360,134 | 12/1967 | Pullen | 252—447 X |
| 3,407,030 | 10/1968 | Clifford et al. | 23—2 |

DANIEL E. WYMAN, Primary Examiner

C. F. DEES, Assistant Examiner

U.S. Cl. X.R.

252—447